J. T. ANDREW.
MEANS FOR ATTACHING SAFETY WHEELS TO CAR AXLES.
APPLICATION FILED JULY 6, 1912.

1,043,559.

Patented Nov. 5, 1912.

Witnesses
Byron B. Collings
H. W. Prime

Inventor
J. T. Andrew
Witherspoon & Mackay
Attorneys

UNITED STATES PATENT OFFICE.

JAMES T. ANDREW, OF MONTGOMERY, ALABAMA.

MEANS FOR ATTACHING SAFETY-WHEELS TO CAR-AXLES.

1,043,559. Specification of Letters Patent. Patented Nov. 5, 1912.

Application filed July 6, 1912. Serial No. 708,046.

*To all whom it may concern:*

Be it known that I, JAMES T. ANDREW, a citizen of the United States, residing at Montgomery, in the county of Montgomery and State of Alabama, have invented certain new and useful Improvements in Means for Attaching Safety-Wheels to Car-Axles; and I do hereby declare the following to be a full, clear, and exact description of the invention, such as will enable others skilled in the art to which it appertains to make and use the same.

This invention relates to means for attaching safety wheels to car axles, and has for its object to further improve the means disclosed in my U. S. Patent No. 985,650, dated February 28, 1911.

To these ends the invention consists in the novel details of construction and combinations of parts more fully hereinafter disclosed and particularly pointed out in the claims.

Figure 1:
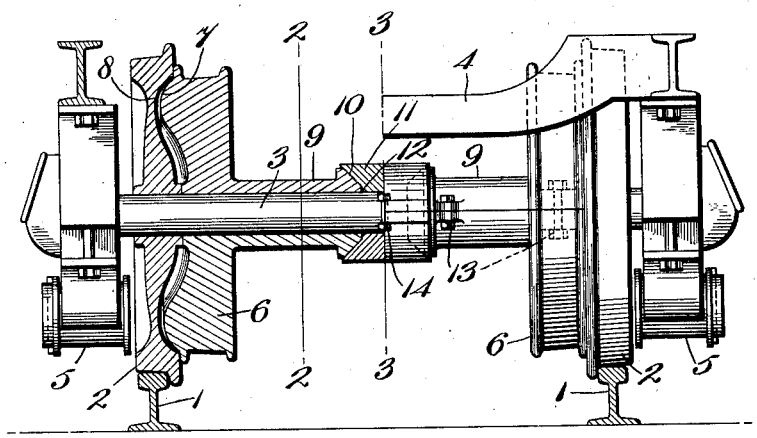
Figure 2:
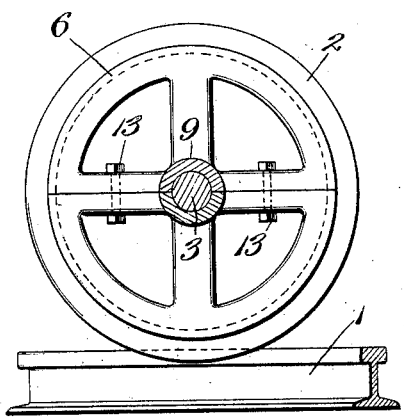
Figure 3:
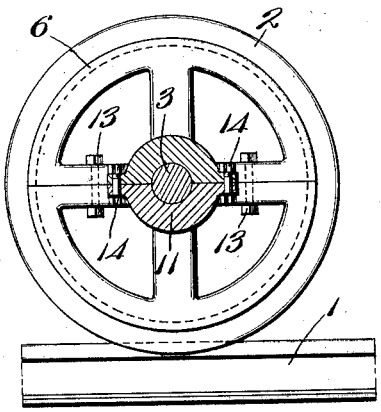

Referring to the accompanying drawings forming a part of this specification in which like numerals designate like parts in all the views:—Figure 1 is a view partly in elevation and partly in section illustrating a portion of a car-truck provided with my invention; Fig. 2 is a cross sectional view taken on the line 2—2 of Fig. 1; and Fig. 3 is a cross sectional view taken on the line 3—3 of Fig. 1.

1 indicates the rail, 2 the usual wheel of a car-truck, 3 the axle thereof, and 4 a portion of the truck framework. On the outside of each wheel 2 I provide the safety rollers 5 as in my former patent above, and on the inside of each wheel I provide the safety wheels 6 located substantially as in my said patent. Instead of securing said safety wheels to the car axle, as is disclosed in my said patent, however, in this invention I provide the said wheels 6 with a projecting portion 7 adapted to extend into the hollow 8 of the car wheels 2 and to become firmly locked in the hollows of said wheels by the means now to be described. That is to say, the said wheels 6 are provided with the sleeves 9 having the bevels 10 to which are fitted the correspondingly beveled collar 11 having the abrupt shoulder 12 as shown. The said collar 11 is of the proper dimensions to fit between the inner ends of the sleeves 9 when the projections 7 of the wheels 6 are snugly fitted into the hollows 8 of the car wheels 2, and therefore said collar 11 serves as a key or a lock for the said wheels 6, and firmly holds them in place.

The wheels 6 as well as the sleeves 9 and collar 11 are preferably divided longitudinally into two parts as shown, and the said parts are firmly bolted together by the bolts 13, or other means.

When assembling the parts the half sections of the safety wheels and sleeves are fitted to the axle, and the bolts 13 are put into place. The said wheels 6 are thereupon fitted as closely as possible to the wheels 2, whereupon the bolts 14 of the collar 11 are set up, and the parts jarred, or otherwise forced into place until the shoulders 12 of the collar 11 seat against the extreme ends of the sleeves 9 and thereby form an efficient lock. The beveled members 10 of the sleeves 9 also enable the collar 11 to act as a wedge in forcing the parts together.

As is made clear from my patent above, when a car equipped with my invention leaves the track, the weight thereof is caught upon the rollers 5 on one side of the truck and upon the safety wheels 6 upon the other side of the truck, and of course, since the weight is enormous, there is a greater or less jar or shock when the rollers 5 and safety wheels 6 are received upon the track rails.

With the construction now disclosed, however, the wheels 6 are firmly braced by the regular wheels 2 as well as by the axle, and the strain which the above shock produces is taken by the axle near the wheel 2, and therefore, the said shock is taken up by the axle precisely as if the ordinary wheel 2 of the car had run over a stone or other obstruction.

What I claim is:—

1. In a safety appliance for railway trucks, the combination of a car axle; a wheel provided with a hollow in its side, on said axle; a safety wheel on said axle provided with a projection adapted to enter said hollow; and means comprising a divided sleeve and a collar secured to said axle for securing said safety wheel on said axle with its projection in said hollow, substantially as described.

2. In a safety appliance for railway trucks, the combination of a car axle; a wheel provided with a hollow in its side on said axle; a safety wheel made in a plurality of parts bolted together on said axle provided with a projection adapted to enter said hollow; and means comprising a collar for securing said safety wheel on said axle with its projection in said hollow, substantially as described.

3. In a safety appliance for railway trucks the combination of a car axle; a pair of car wheels thereon; a pair of safety wheels located beside said car wheels, each having a sleeve made in two parts bolted on said axle, and said sleeves being shorter than the space between said safety wheels; and a collar on said axle between said sleeves serving to lock said safety wheels in place, substantially as described.

4. In a safety appliance for railway trucks the combination of a car axle; a pair of car wheels thereon having hollow faces; a pair of safety wheels located beside said car wheels, each having a projection entering a face of said car wheels, each having a sleeve made in two parts bolted on said axle, and said sleeves being shorter than the space between said safety wheels; and a collar on said axle between said sleeves serving to lock said safety wheels in place, substantially as described.

JAMES T. ANDREW.

Witnesses:
T. A. WITHERSPOON,
R. N. PARKER.

Copies of this patent may be obtained for five cents each, by addressing the "Commissioner of Patents, Washington, D. C."